(12) United States Patent
Usui

(10) Patent No.: US 7,901,170 B2
(45) Date of Patent: Mar. 8, 2011

(54) HOLDING DEVICE FOR HOLDING OBJECT

(75) Inventor: Hirokazu Usui, Nagoya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 11/889,073

(22) Filed: Aug. 9, 2007

(65) Prior Publication Data

US 2008/0073821 A1 Mar. 27, 2008

(30) Foreign Application Priority Data

Sep. 26, 2006 (JP) ................................ 2006-261317
Apr. 19, 2007 (JP) ................................ 2007-110890

(51) Int. Cl.
*F16B 13/04* (2006.01)
(52) U.S. Cl. .............. 411/34; 411/38; 411/42; 411/57.1; 411/913
(58) Field of Classification Search .................... 411/34, 411/38, 42, 57.1, 60.1, 500–501, 913
See application file for complete search history.

(56) References Cited

U.S. PATENT DOCUMENTS

| | | | | |
|---|---|---|---|---|
| 1,179,472 | A | | 4/1916 | Tarleton |
| 2,353,248 | A | * | 7/1944 | Lamb ........................... 269/48.2 |
| 2,570,618 | A | * | 10/1951 | Werner ........................ 411/60.1 |
| 3,257,891 | A | * | 6/1966 | Lerich ............................. 411/79 |
| 5,042,888 | A | * | 8/1991 | Shinjo ............................. 411/54 |
| 5,228,815 | A | * | 7/1993 | Gignac et al. .................... 411/45 |
| 5,439,264 | A | | 8/1995 | Margiottiello |
| 5,647,627 | A | * | 7/1997 | Baessler ......................... 294/96 |
| 5,658,107 | A | * | 8/1997 | Smith ............................. 411/34 |
| 5,927,919 | A | * | 7/1999 | Blankenship et al. ....... 411/60.1 |
| 6,722,711 | B2 | * | 4/2004 | Kitzis ............................ 292/145 |
| 6,729,821 | B2 | * | 5/2004 | Guthrie et al. ................... 411/80 |
| 2007/0253793 | A1 | * | 11/2007 | Moore ............................ 411/43 |

FOREIGN PATENT DOCUMENTS

| | | |
|---|---|---|
| CH | 636293 A5 | 5/1983 |
| GB | 2337 983 A | 12/1999 |
| JP | A-06-129936 | 5/1994 |
| JP | U-H6-46887 | 6/1994 |
| JP | A-06-286974 | 10/1994 |
| JP | A-2000-086144 | 3/2000 |

(Continued)

OTHER PUBLICATIONS

Notice of Final Rejection issued from the Korean Intellectual Property Office on Apr. 6, 2009 in the corresponding Korean patent application No. 10-2007-0097030 (with English translation).

(Continued)

*Primary Examiner* — Victor Batson
*Assistant Examiner* — Roberta Delisle
(74) *Attorney, Agent, or Firm* — Posz Law Group, PLC

(57) ABSTRACT

A holding device for holding an object having an opening includes: a first member inserted into the opening, having a cylindrical shape, and including multiple divisional portions divided by notches; and a second member including a shaft movable in the cylindrical shape and a head disposed on one end of the shaft and smaller than the opening and larger than an inner dimension of the cylindrical shape. Each divisional portion is expandable by the head so that the expanded divisional portion holds the object when the first member with the second member is inserted into the opening, and the first member is relatively displaced toward the second member.

16 Claims, 9 Drawing Sheets

FOREIGN PATENT DOCUMENTS

| | | |
|---|---|---|
| JP | A-2002-120186 | 4/2002 |
| JP | A-2002-186332 | 7/2002 |

OTHER PUBLICATIONS

Office Action issued from the German Patent Office on Apr. 21, 2009 in the corresponding German patent application No. 10 2007 045 502.1-15 (and English translation).

Office Action dated Nov. 12, 2008 in corresponding Korean patent application No. 10-2007-0097030 (and English translation).

Second Office Action issued from the Chinese Patent Office on Feb. 12, 2010 in the corresponding Chinese patent application No. 200710154395.0 (English translation thereof).

* cited by examiner

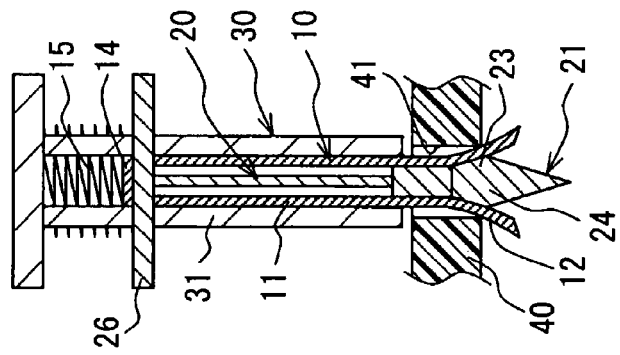
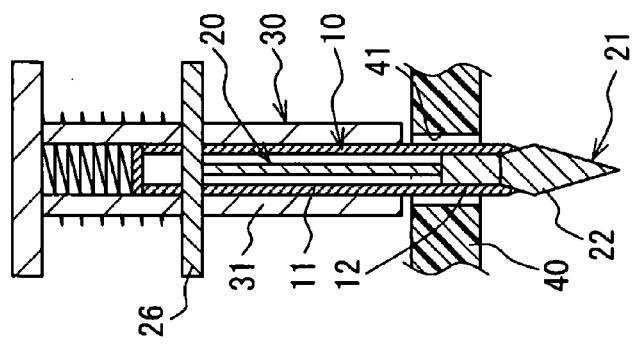
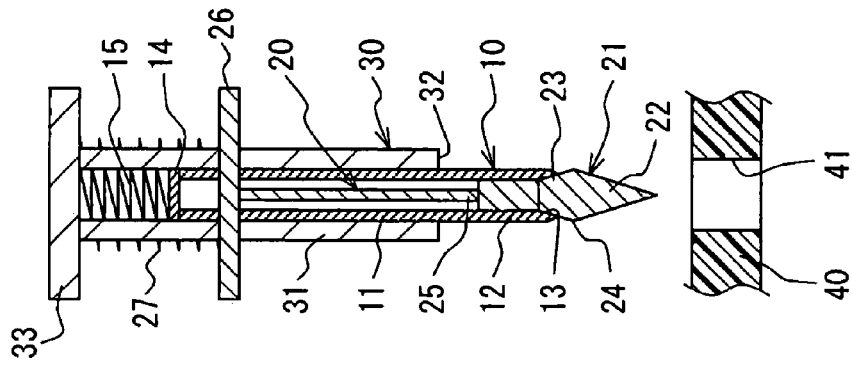

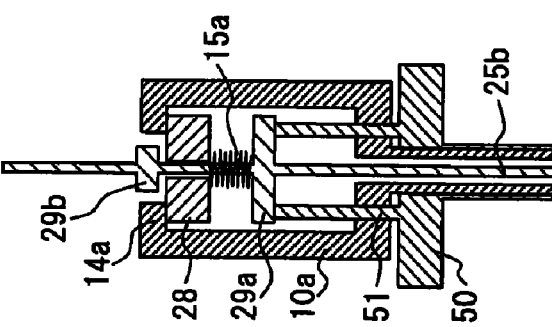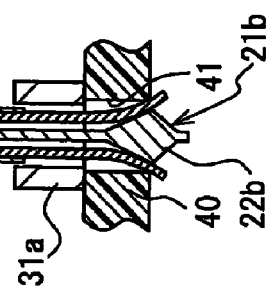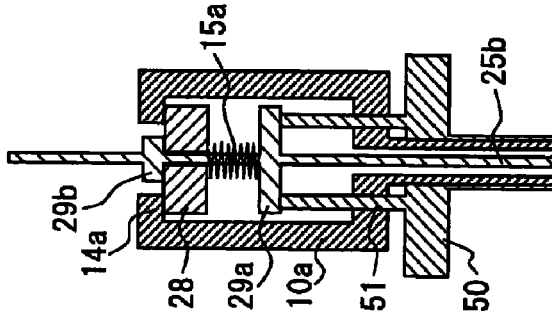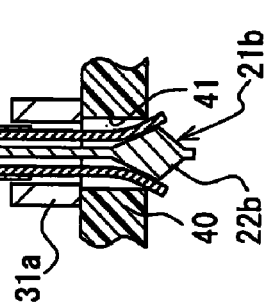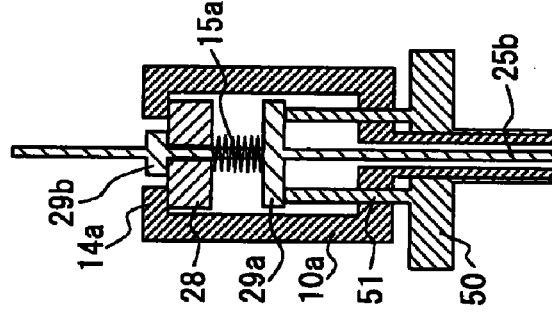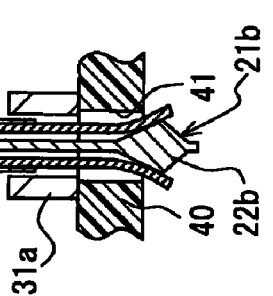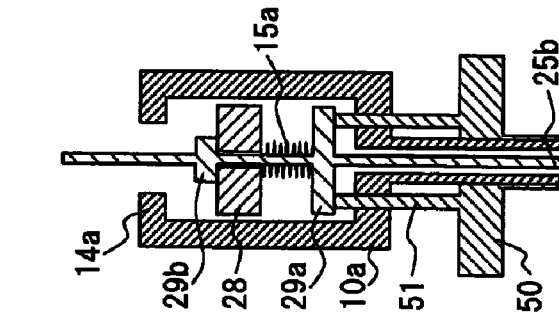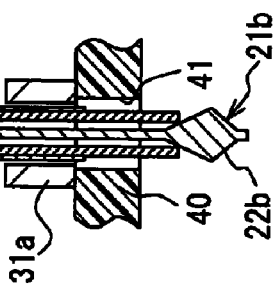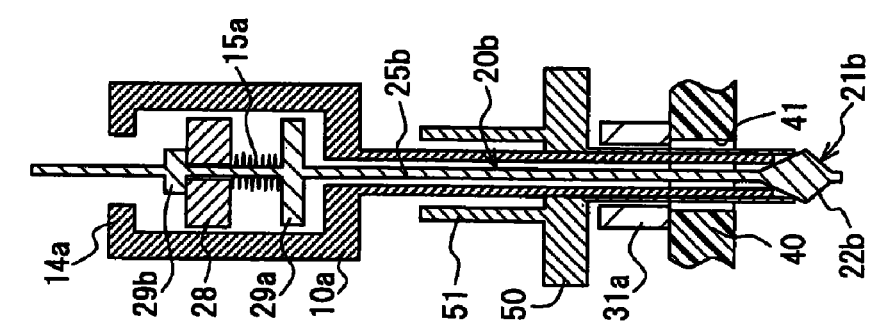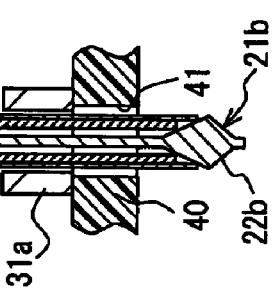

HOLDING DEVICE FOR HOLDING OBJECT

CROSS REFERENCE TO RELATED APPLICATIONS

This application is based on Japanese Patent Applications No. 2006-261317 filed on Sep. 26, 2006, and No. 2007-110890 filed on Apr. 19, 2007, the disclosures of which are incorporated herein by reference.

FIELD OF THE INVENTION

The present invention relates to a holding device for holding an object.

BACKGROUND OF THE INVENTION

There is conventionally a tool shown in JP-A-2002-120186 as a work gripping tool, i.e., a holding device for holding a work as an object. In the work gripping tool, plural adsorbing pads for adsorbing and holding the work are arranged, and the work is gripped by this adsorbing pad.

The work gripping tool can grip the work if there is a flat face in the work. This work gripping tool has a general purpose property to a certain extent. However, in the work gripping tool, holding force (adsorbing force) becomes weak when an adsorbing face of the work is small. When the work hits against a tool of the circumference, etc., there is a possibility that the work drops. Further, when a clearance is caused on the adsorbing face even a little, the work gripping tool cannot grip the work.

Thus, it is required to provide a work gripping tool able to reduce the dropping of the work and improve the general purpose property.

SUMMARY OF THE INVENTION

In view of the above-described problem, it is an object of the present disclosure to provide a holding device for holding an object.

According to a first aspect of the present disclosure, a holding device for holding an object, which has an opening, includes: a first member for being inserted into the opening of the object, wherein the first member has a cylindrical shape extending along with an axial direction of the cylindrical shape, which is in parallel to an axial direction of the opening of the object, wherein the first member includes a plurality of divisional portions, which are divided by a plurality of notches extending from one end of the cylindrical shape along with the axial direction of the cylindrical shape, and wherein the one end of the cylindrical shape is to be inserted into the opening of the object; and a second member including a shaft and a head, wherein the shaft is movable in the cylindrical shape along with the axial direction of the cylindrical shape, wherein the head is disposed on one end of the shaft, and wherein the head is smaller than a dimension of the opening of the object, and larger than an inner dimension of the cylindrical shape. Each divisional portion is expandable at the one end of the cylindrical shape by the head of the second member so that the expanded divisional portion holds the object when the first member together with the second member is inserted into the opening of the object, and the first member is relatively displaced toward the second member.

In the above device, the first member together with the second member is inserted into the opening of the object. Accordingly, the holding device is prevented from being dropped from the holding device. Further, since the object generally includes the opening, general versatility of the device is improved.

According to a second aspect of the present disclosure, a holding device for holding an object, which has an opening, includes: a first member for being inserted into the opening of the object, wherein the first member has a cylindrical shape extending along with an axial direction of the cylindrical shape, which is in parallel to an axial direction of the opening of the object, wherein the first member includes a plurality of divisional portions, which are divided by a plurality of notches extending from one end of the cylindrical shape along with the axial direction of the cylindrical shape, wherein the one end of the cylindrical shape is to be inserted into the opening of the object, and wherein the plurality of divisional portions provides an inner dimension of the cylindrical shape, which is smaller than an inner dimension of another portion of the first member; and a second member movable in the cylindrical shape of the first member along with the axial direction of the cylindrical shape, wherein the second member is larger than the inner dimension of the plurality of divisional portions. Each divisional portion is expandable at the one end of the cylindrical shape by the second member so that the expanded divisional portion holds the object when the first member together with the second member is inserted into the opening of the object, and the first member is relatively displaced toward the second member.

In the above device, the first member together with the second member is inserted into the opening of the object. Accordingly, the holding device is prevented from being dropped from the holding device. Further, since the object generally includes the opening, general versatility of the device is improved.

According to a third aspect of the present disclosure, a holding device for holding an object, which has an opening, includes: a first member for being inserted into the opening of the object, wherein the first member includes a plurality of wires and a holder, wherein the holder holds the plurality of wires, and wherein the plurality of wires are apart from each other; and a second member including a shaft and a head, wherein the first member is disposed on an outside of the second member in such a manner that the first member is movable along with an axial direction of the shaft, wherein the head is disposed on one end of the shaft, wherein the head has a plurality of grooves corresponding to the plurality of wires, and wherein each groove has a depth, which becomes shallower toward one end of the head. Each wire is expandable at one end of the wire by the head of the second member so that the expanded wire holds the object when the first member together with the second member is inserted into the opening of the object, and the first member is relatively displaced toward the second member.

In the above device, the first member together with the second member is inserted into the opening of the object. Accordingly, the holding device is prevented from being dropped from the holding device. Further, since the object generally includes the opening, general versatility of the device is improved.

BRIEF DESCRIPTION OF THE DRAWINGS

The above and other objects, features and advantages of the present invention will become more apparent from the following detailed description made with reference to the accompanying drawings. In the drawings:

FIGS. 3A to 3D are cross-sectional views every process showing the operation of the work gripping tool in the embodiment mode;

FIGS. 11A to 11E are cross-sectional views every process showing the operation of a work gripping tool in a modified example 6 of the embodiment mode;

DETAILED DESCRIPTION OF THE PREFERRED EMBODIMENTS

Figure 1:
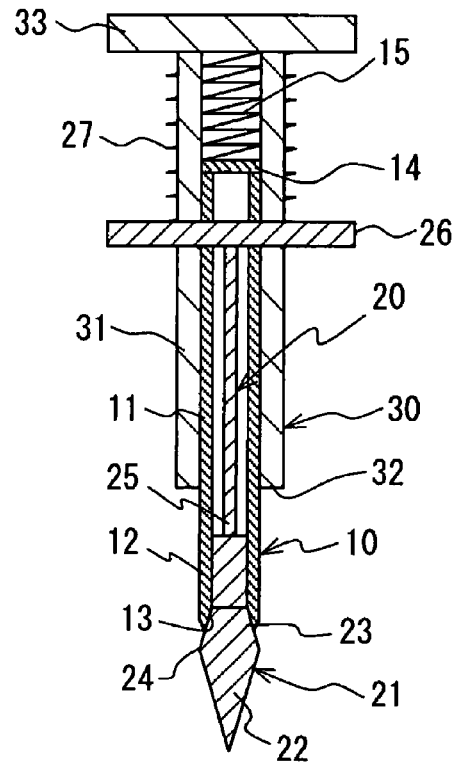
FIG. 1 is a cross-sectional view showing the schematic construction of a work gripping tool in an embodiment mode.
Figure 2:
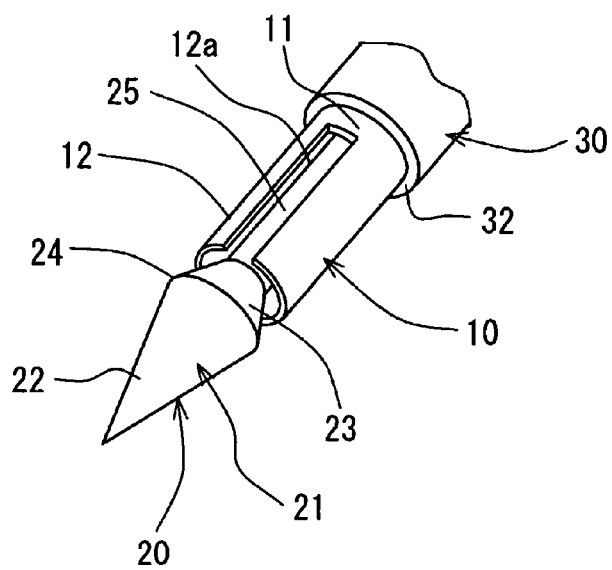
FIG. 2 is a perspective view showing the schematic construction of the work gripping tool in the embodiment mode.

FIG. 1 is a cross-sectional view showing the schematic construction of a work gripping tool as a holding device in an embodiment mode. FIG. 2 is a perspective view showing the schematic construction of the work gripping tool in the embodiment mode. FIGS. 3A to 3D are cross-sectional views every process showing the operation of the work gripping tool in the embodiment mode. The work gripping tool in this embodiment mode is program-controlled by a controller having a computer, etc. on a production line, etc., and grips and conveys a work.

As shown in FIGS. 1 to 3D, the work gripping tool in this embodiment mode grips a work 40 forming a hole 41 therein. The work gripping tool has an inner pipe (first member) 10, a bar member (second member) 20 in which at least one portion is arranged in a movable state in an axial direction of the hole 41 within the inner pipe 10, and an outer pipe (third member) 30 for holding at least one portion of the inner pipe 10 in the movable state in the axial direction of the hole 41 therein.

The inner pipe 10 is constructed by a material such as a super elastic metal, etc. easily elastically deformed with respect to the bar member 20. The inner pipe 10 has a sleeve portion 11 extending in the axial direction of the hole 41 of the work 40, a dividing portion 12 divided into plural (three in FIG. 2) portions by a slit (notch) 12a extending in the axial direction of the hole 41 in an end portion of an insertion direction side (lower side in FIG. 1) into the hole 41 in the sleeve portion 11, and an inner pipe ceiling portion 14 (associating mechanism) in an end portion of a side (upper side in FIG. 1) opposed to the dividing portion 12. The dividing portion 12 has a taper portion 13 having an opening area gradually reduced from an opening end portion. Further, a second spring 15 for pressing the inner pipe 10 on the insertion direction side (lower side in FIG. 1) into the hole 41 is arranged between the inner pipe ceiling portion 14 and an outer pipe ceiling portion 33 explained later.

As explained later, it is necessary that the inner pipe 10 is approximately returned to its original shape when the dividing portion 12 is pushed and widened by a projecting shape portion 21 of the bar member 20 and pressing force from the projecting shape portion 21 is vanished. Therefore, the inner pipe 10 is preferably formed by a super elastic metal. However, the inner pipe 10 is not limited to the super elastic metal, but may be set to a material able to be approximately returned to the original shape when the dividing portion 12 is pushed and widened by the projecting shape portion 21 of the bar member 20 and the pressing force from the projecting shape portion 21 is vanished.

The bar member 20 has a projecting shape portion 21 smaller than an opening width (area) of the hole 41 and greater than an opening width (area) of the inner pipe 10, a bar portion 25 connected to the projecting shape portion 21 and extending in the axial direction of the inner pipe 10, and a handle portion 26 (associating mechanism) for moving the bar member 20 arranged on a side opposed to the projecting shape portion 21 of the bar portion 25. Further, a first spring 27 for pressing the bar member 20 on the insertion direction side (lower side in FIG. 1) into the hole 41 is arranged between the handle portion 26 and the outer pipe ceiling portion 33 described later. The bar member 20 is pulled up from a stopping position to a gripping position, and this pulling-up is released by an unillustrated actuator, etc. When the pulling-up is released, the bar member 20 is returned to the stopping position by pressing force of the first spring 27 and the second spring 15. As shown in FIG. 1, etc., the stopping position is a position in which the projecting shape portion 21 is arranged outside the inner pipe 10 and presses no inner pipe 10. Further, as shown in FIGS. 3C and 3D, the gripping position is a position in which the projecting shape portion 21 is arranged within the inner pipe 10 and presses, pushes and widens the inner pipe 10.

The projecting shape portion 21 has a tip portion 22 as a conical body sharpened on the insertion direction side (lower side in FIG. 1) into the hole 41, a pressing portion 23 as a columnar body of a taper shape gradually widened as a side face is advanced in the insertion direction into the hole, and a maximum outer shape portion 24 constituting a boundary portion of the tip portion 22 and the pressing portion 23 and becoming maximum with respect to the size of a planar direction. This maximum outer shape portion 24 forms a shape projected outside from the dividing portion 12 in a direction perpendicular to an axis of the hole 41. The projecting shape portion 21 is connected to the bar portion 25 on the pressing portion 23 side. Further, the side face of the pressing portion 23 forms a shape corresponding to the taper portion 13 of the inner pipe 10.

The projecting shape portion 21 is formed in a shape for connecting the conical body as the tip portion 22 and the columnar body as the pressing portion 23. However, the projecting shape portion 21 is not limited to the shape for connecting the conical body and the columnar body arranged in separate bodies, but a member for connecting the conical body and the columnar body may be also integrally arranged.

Further, in this embodiment mode, the projecting shape portion 21 is explained by using an example for arranging the tip portion 22 and the pressing portion 23. Alternatively, the projecting shape portion 21 may be smaller than the opening width (area) of the hole 41 and is greater than the opening width (area) of the inner pipe 10.

Further, in this embodiment mode, the projecting shape portion 21 is explained by using an example in which the maximum outer shape portion 24 is projected outside the dividing portion 12 in the direction perpendicular to the axis of the hole 41. Alternatively, the projecting shape portion 21 may be smaller than the opening width (area) of the hole 41 and is greater than the opening width (area) of the inner pipe 10.

An outer pipe 30 nips the work 40 together with the dividing portion 12 of the inner pipe 10. The outer pipe 30 has a sleeve portion 31 extending in the axial direction of the hole 41 of the work 40 and greater than the opening area of the hole 41, a contact face 32 coming in contact with the work 40 in an end portion of the insertion direction side (lower side in FIG. 1) into the hole 41 in the sleeve portion 31, and an outer pipe ceiling portion 33 in an end portion of a side (upper side in FIG. 1) opposed to the contact face 32. Further, the contact face 32 can prevent that the outer pipe 30 is rotated and shifted on the work 40 surface by performing rough processing. Thus, the work can be more stably gripped preferably.

Such a work gripping tool is program-controlled and operated by an unillustrated controller. For example, the work gripping tool is connected to one portion of an unillustrated conveyer and this conveyer is operated on the basis of a control signal from the controller so that the work gripping tool is moved between a position corresponding to a conveying source of the work 40 and a position corresponding to a conveying destination of the work 40. Further, an unillustrated actuator, etc. are mechanically connected to the handle portion 26 and this actuator operates the handle portion 26 on the basis of a control signal from the controller so that the bar member 20 is pulled up and this pulling-up is released. The work 40 is gripped by the pulling-up of the bar member 20 and the work 40 is released from the work gripping tool by the release of the pulling-up of the bar member 20.

The work 40 is a print substrate, a circuit substrate mounting a circuit part to the print substrate, etc. in which the unified hole 41 is formed. The work 40 is not particularly limited if the hole 41 is formed. However, it is preferable that the work 40 is a work having a hole unified in a hole diameter, a hole shape, etc. With respect to this point, even when the print substrate and the circuit substrate used in this embodiment mode have no unified hole, it is comparatively easy to arrange the unified hole, i.e., problems in design and function are few.

Here, the operation of the work gripping tool in this embodiment mode will be explained.

First, as shown in FIG. 3A, the bar member 20 is located in a stopping position before the work gripping tool is inserted into the hole 41 of the work 40. Accordingly, the projecting shape portion 21 of the bar member 20 is arranged outside the inner pipe 10, and is located in a position for pressing no inner pipe 10.

Next, as shown in FIG. 3B, one portion of the work gripping tool, i.e., the dividing portion 12 of the inner pipe 10 and the projecting shape portion 21 of the bar member 20 in a member located on a side lower than the outer pipe 30 are inserted into the hole 41 of the work 40. At this time, the projecting shape portion 21 has the tip portion 22 as a conical body. Therefore, even when the positions of the work gripping tool and the hole 41 are shifted, the work gripping tool (the dividing portion 12 of the inner pipe 10 and the projecting shape portion 21 of the bar member 20) can be set to be easily inserted into the hole 41.

Further, the maximum outer shape portion 24 of the projecting shape portion 21 is formed in a shape projected outside the dividing portion 12 in the direction perpendicular to the axis of the hole 41. Therefore, when the work gripping tool (the dividing portion 12 of the inner pipe 10 and the projecting shape portion 21 of the bar member 20) is inserted into the hole 41, it is possible to prevent that the dividing portion 12 is engaged with the hole 41.

Next, as shown in FIG. 3C, in a state in which the work gripping tool is inserted into the hole 41 of the work 40, the bar member 20 is pulled up until the position of the inner pipe ceiling portion 14 of the inner pipe 10. Namely, the bar member 20 is moved in a direction opposed to the insertion direction into the hole 41 (gripping position). Thus, the projecting shape portion 21 is moved into the inner pipe 10, and the pressing portion 23 presses against the dividing portion 12. Accordingly, the dividing portion 12 is pushed and widened by the projecting shape portion 21 (pressing portion 23), and is engaged with the work 40 on a rear face side (lower side in FIG. 3A to 3D) of the work 40, i.e., on a side opposed to the inserted side of the work gripping tool (FIGS. 3C and 3D), and the work 40 is gripped by performing escape stoppage. Thus, the work 40 is gripped by the dividing portion 12 pushed and widened in a state inserted into the hole of the work 40. Therefore, it is possible to reduce the possibility that the work 40 drops from the work gripping tool.

At this time, the dividing portion 12 has the taper portion 13 having an opening area gradually reduced from an opening end portion. Therefore, the dividing portion 12 can be set to be easily pushed and widened by the projecting shape portion 21 (pressing portion 23). Further, the projecting shape portion 21 has the pressing portion 23 as a columnar body of a taper shape gradually widened as the side face is advanced in the insertion direction into the hole. Therefore, the dividing portion 12 can be easily pushed and widened.

As shown in FIG. 3D, the bar member 20 located in a gripping position is further pulled up. Namely, the bar member 20 is moved in a direction opposed to the insertion direction into the hole 41. Thus, the bar member 20 is pulled up in a state coming in contact with the inner pipe ceiling portion 14. Accordingly, the inner pipe 10 is moved in the direction opposed to the insertion direction into the hole 41 in association with the movement of the bar member 20. At this time, the inner pipe 10 is moved in the direction opposed to the insertion direction into the hole 41 in a state engaged with a rear face of the work 40. Therefore, the work 40 is also moved in the same direction as the inner pipe 10 and the bar member 20. The bar member 20 is then pulled up until a position in which the work 40 comes in contact with a contact face 32 of the outer pipe 30. Thus, the contact face 32 of the outer pipe 30 comes in contact with the work 40, and the work 40 is nipped by the outer pipe 30 and the dividing portion 12 of the inner pipe 10. Thus, since the work 40 is nipped by the dividing portion 12 and the outer pipe 30, the work 40 can be stably gripped.

In this embodiment mode, an example for gripping the work 40 is used by pulling-up the bar member 20 until the position of the inner pipe ceiling portion 14 of the inner pipe 10 in a state in which the dividing portion 12 of the inner pipe 10 and the projecting shape portion 21 of the bar member 20 are inserted into the hole 41 of the work 40.

In a state in which the dividing portion 12 of the inner pipe 10 and the projecting shape portion 21 of the bar member 20 are inserted into the hole 41 of the work 40, the bar member 20 is not pulled up until the position of the inner pipe ceiling portion 14 of the inner pipe 10, but the inner pipe 10 may be pushed out so as to make the dividing portion 12 hit against the projecting shape portion 21, and the dividing portion 12 may be also pushed and widened. The work 40 may be also gripped in this way.

Namely, the bar member 20 having the projecting shape portion 21 of a shape enlarged in its diametrical direction at the tip, and the inner pipe 10 divided along its axial direction at the tip are closed since the dividing portion 12 of the inner pipe 10 is separated from the projecting shape portion 21 of the bar member 20. Namely, the dividing portion 12 of the inner pipe 10 attains a state parallel to the axial direction and having no spread in the diametrical direction.

On the other hand, the dividing portion 12 of the inner pipe 10 comes in contact with the projecting shape portion 21 of the bar member 20 by relatively changing the positions of the inner pipe 10 and the bar member 20. Thus, the dividing portion 12 is gradually opened in the diametrical direction. Namely, as the dividing portion 12 of the inner pipe 10 is advanced toward its tip with respect to the axial direction, each dividing portion 12 of the inner pipe 10 attains a state for mutually increasing its relative distance.

Namely, even when one of the inner pipe 10 and the bar member 20 is moved, it is sufficient if positions are set to be changed such that the dividing portion 12 of the inner pipe 10 and the projecting shape portion 21 of the bar member 20 relatively come in contact with each other.

When the wall thickness of the tip of each dividing portion 12 of the inner pipe 10 is thicker, a ratio for hitting against the projecting shape portion 21 of the bar member 20 and widening this tip is strengthened.

Further, in this embodiment mode, an example in which the hole 41 of the work 40 is a through hole is used. Namely, the hole 41 of the work 40 may be also a non-through hole. When the hole 41 is a through hole, the dividing portion 12 is pushed and widened by the projecting shape portion 21 in a state in which the dividing portion 12 passes through the hole 41. Thus, the dividing portion 12 is engaged with the work 40 on the rear face side (lower side in FIGS. 3A to 3D) of the work 40, i.e., on a side opposed to the inserted side of the work gripping tool (FIGS. 3C and 3D). The work 40 is then gripped by performing escape stoppage. In contrast to this, when the hole 41 is a non-through hole, the dividing portion 12 is pushed and widened by the projecting shape portion 21. Thus, the work 40 is gripped by pressing an inner circumferential face of the non-through hole.

MODIFIED EXAMPLE 1

Figure 4A:
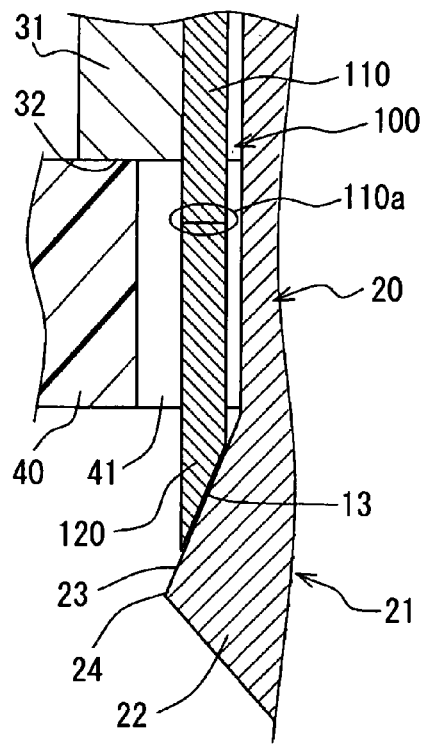
FIGS. 4A to 4C are cross-sectional views every process showing the operation of a work gripping tool in a modified example 1 of the embodiment mode.
Figure 4B:
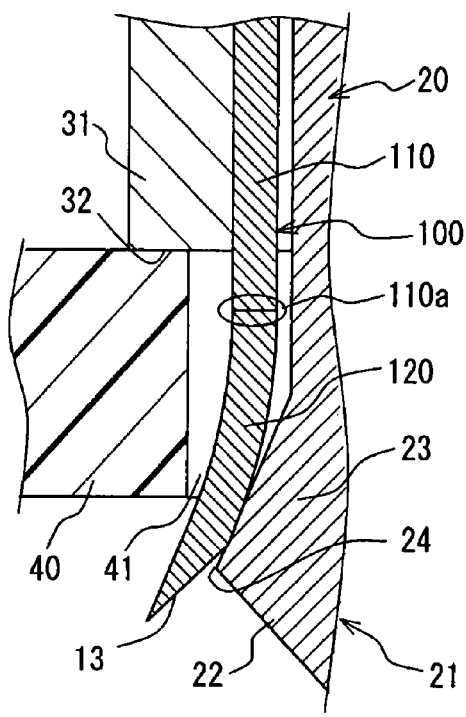
Figure 4C:
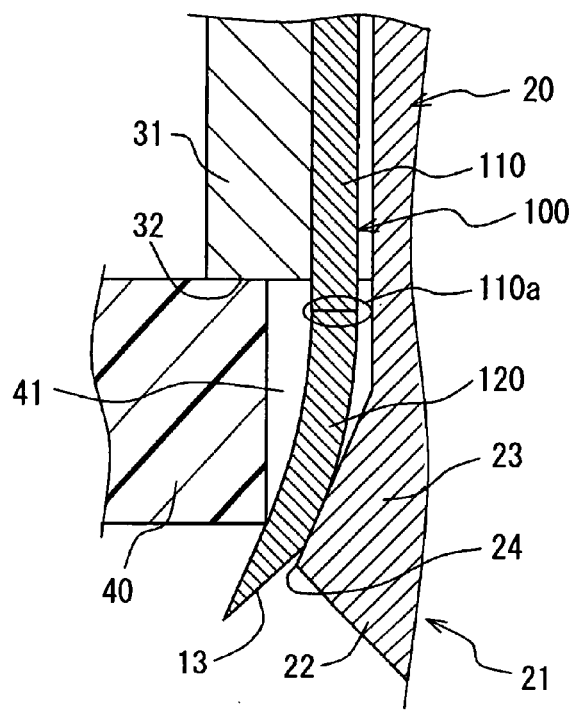

Further, as a modified example 1, a root portion 110a (a base point of a notch) of a dividing portion 120 of an inner pipe 100 with a sleeve portion 110 may be also arranged in about the same position as the outer pipe 30, or may be also arranged on a side lower than the outer pipe 30. FIGS. 4A to 4C are cross-sectional views every process showing the operation of the work gripping tool in the modified example 1. The work gripping tool in the modified example 1 is common to that in the above embodiment mode in many portions. In the modified example 1, a point different from the above embodiment mode is the position of the root portion 110a of the dividing portion 120.

As shown in FIG. 4A, the root portion 110a of the dividing portion 120 is set such that the axial position of the inner pipe 10 is arranged in about the same position as a contact face 32 with the work 40 in the outer pipe 30, or is arranged in a position projected from the contact face 32.

Thus, as shown in FIG. 4B, even when the bar member 20 is pulled up until a gripping position in a state in which the work gripping tool is inserted into the hole 41 of the work 40, i.e., even when the dividing portion 120 is pushed and widened by the projecting shape portion 21, it is possible to restrain that the dividing portion 120 comes in contact with the outer pipe 30. Accordingly, it is possible to restrain that the dividing portion 120 comes in contact with the outer pipe 30 and is deformed. Thus, the work 40 can be reliably gripped.

Further, as shown in FIG. 4C, it is preferable that the axial position of the inner pipe 10 with respect to the root portion 110a of the dividing portion 120 is arranged in about the same position as the contact face 32 with the work 40 in the outer pipe 30, or is arranged in a position projected from the contact face 32 even when the inner pipe 100 is pulled up. Namely, it is thus possible to restrain that the dividing portion 120 comes in contact with the outer pipe 30 and is deformed even at a time point at which the inner pipe 100 is pulled up. Thus, the work 40 can be more reliably gripped.

MODIFIED EXAMPLE 2

Figure 5:
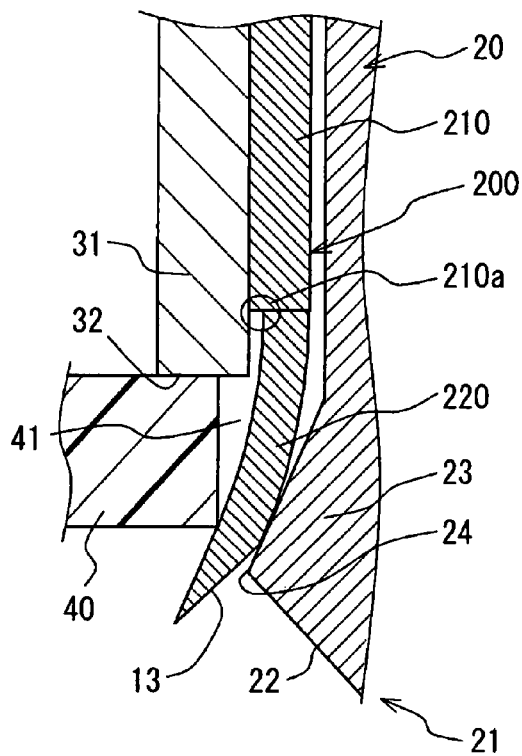
FIG. 5 is a cross-sectional view showing the schematic construction of a work gripping tool in a modified example 2 of the embodiment mode.

Further, as a modified example 2, a step difference portion 210a may be also arranged in a root portion (a base point of a notch) of a dividing portion 220 of an inner pipe 200. FIG. 5 is a cross-sectional view showing the schematic construction of a work gripping tool in the modified example 2. The work gripping tool in the modified example 2 is common to that in the above embodiment mode in many portions. In the modified example 2, a point different from the above embodiment mode is that a step difference portion 210a is arranged.

As shown in FIG. 5, a sleeve portion 210 of an inner pipe 200 is arranged so as to come in contact with the outer pipe 30 and the dividing portion 220 is arranged so as to be separated from the outer pipe 30. Namely, the step difference portion 210a recessed in the axial direction of the inner pipe 200 from the outer circumferential face of a sleeve portion 210 in a root portion (a base point of a notch) of the dividing portion 220 is arranged in the inner pipe 200.

Thus, even when the bar member 20 is pulled up until a gripping position in a state in which the work gripping tool is inserted into the hole 41 of the work 40, i.e., even when the dividing portion 220 is pushed and widened by the projecting shape portion 21, it is possible to restrain that the dividing portion 220 comes in contact with the outer pipe 30. Accordingly, it is possible to restrain that the dividing portion 220 comes in contact with the outer pipe 30 and is deformed. Thus, the work 40 can be reliably gripped.

Further, even when the inner pipe 200 is pulled up, it is possible to restrain that the dividing portion 220 comes in contact with the outer pipe 30. Accordingly, it is possible to restrain that the dividing portion 220 comes in contact with the outer pipe 30 and is deformed. Thus, the work 40 can be reliably gripped.

MODIFIED EXAMPLE 3

Figure 6:
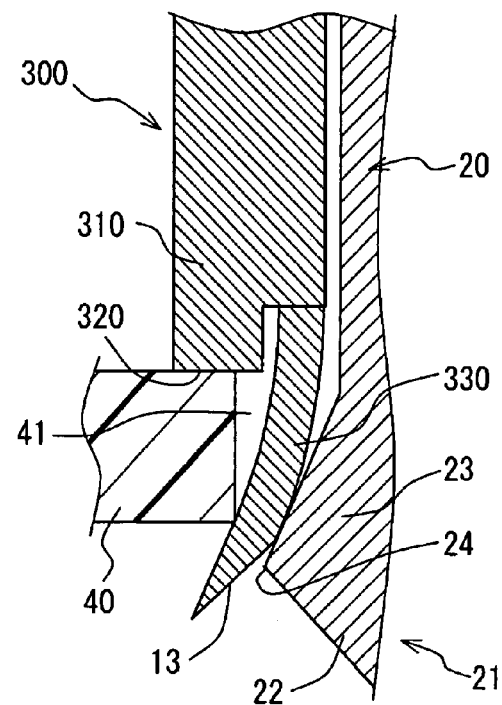
FIG. 6 is a cross-sectional view showing the schematic construction of a work gripping tool in a modified example 3 of the embodiment mode.

Further, as a modified example 3, the inner pipe 10 and the outer pipe 30 may be also integrally arranged. FIG. 6 is a cross-sectional view showing the schematic construction of a work gripping tool in the modified example 3. The work gripping tool in the modified example 3 is common to that in the above embodiment mode in many portions. In the modified example 3, a point different from the above embodiment mode is that a pipe 300 is arranged.

Namely, as shown in FIG. 6, the pipe 300 having the inner pipe 10 and the outer pipe 30 integrally arranged has a sleeve portion 310 extending in the axial direction of the hole 41 of the work 40, a contact face 320 formed in one end portion of the sleeve portion 310 and coming in contact with the work 40, and a dividing portion 330 formed in one end portion of the sleeve portion 310 and constructed by a super elastic metal, etc.

Further, in a root portion of the dividing portion 330, the axial position of the pipe 300 is preferably arranged in about the same position as the contact face 320 or a position projected from the contact face 320. Thus, even when the bar member 20 is pulled up until a gripping position, it is possible to restrain that the dividing portion 330 comes in contact with an end portion of the contact face 320. Accordingly, it is possible to restrain that the dividing portion 330 comes in contact with the end portion of the contact face 320 and is deformed. Thus, the work 40 can be reliably gripped.

Further, the dividing portion 330 is preferably arranged so as to be separated from the end portion of the contact face 320. Thus, even when the bar member 20 is pulled up until the gripping position, it is possible to restrain that the dividing portion 330 comes in contact with the end portion of the contact face 320. Accordingly, it is possible to restrain that the dividing portion 330 comes in contact with the end portion of the contact face 320 and is deformed. Thus, the work 40 can be reliably gripped.

MODIFIED EXAMPLE 4

Figure 7A:
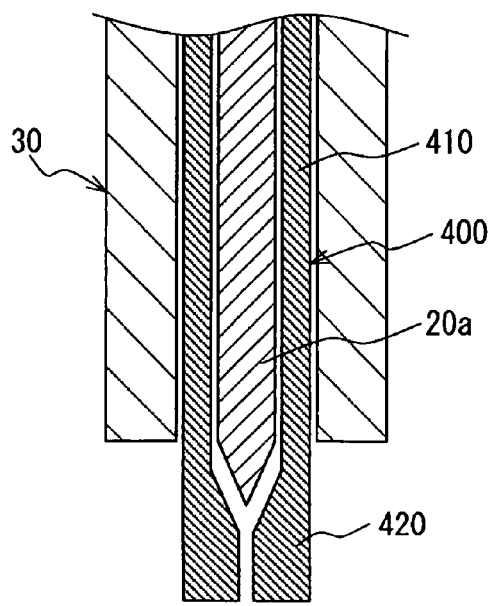
FIGS. 7A and 7B are cross-sectional views every process showing the operation of a work gripping tool in a modified example 4 of the embodiment mode.
Figure 7B:
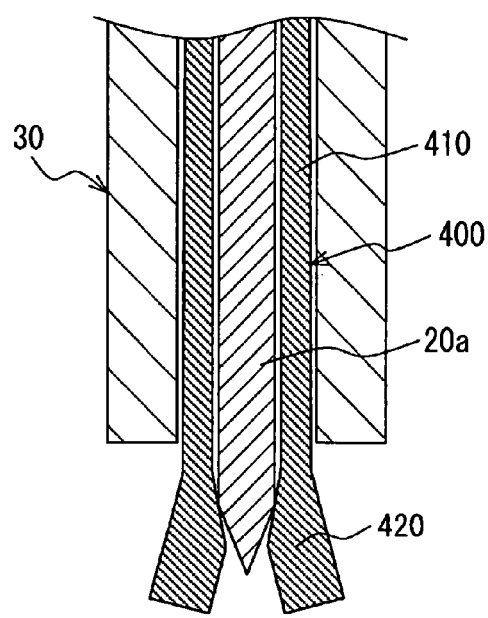

Further, as a modified example 4, it may be also set to a structure reversely formed in the structure of an inner pipe 400 and a bar member 20a. FIGS. 7A and 7B are cross-sectional views every process showing the operation of a work gripping tool in the modified example 4. In the modified example 4, there are many portions similar to those of the above embodiment mode and the modified examples 1 to 3.

Namely, as shown in FIG. 7A, the inner pipe 400 is formed in a sleeve shape extending in the axial direction of the hole 41 of the work 40. A dividing portion 420 is arranged in an end portion of the insertion direction side into the hole 41, and has an inside diameter smaller than that of another portion (sleeve portion 410) and is divided into plural portions by a notch extending in the axial direction of the hole. On the other hand, the bar member 20a has an opening width greater than that of the dividing portion 420, and is formed in a shape in which a tip portion is sharpened in a taper shape.

When the work 40 is gripped by such inner pipe 400 and bar member 20a, as shown in FIG. 7B, the inner pipe 400 and the bar member 20a are relatively moved in opposite directions with respect to the direction inserted into the hole 41 in a state in which the inner pipe 400 and the bar member 20a are inserted into the hole 41 of the work 40. Thus, the inner pipe 400 and the bar member 20a come in contact with each other, and the dividing portion 420 is pushed and widened by the bar member 20a. Thus, the work 40 is gripped by the dividing portion 420. Namely, the dividing portion 420 is pushed and widened by the bar member 20a, and is engaged with the work 40 on the rear face side of the work 40, i.e., on a side opposed to the inserted side of the work gripping tool. Thus, the work 40 is gripped by performing escape stoppage.

In other words, in the modified example 4, in a state for holding no work 40, the bar member 20a is located on a deep side of the axial direction of the inner pipe 400, and a tip portion of the dividing portion 420 of the inner pipe 400 is formed as a thick wall so as to become thick in comparison with the wall thickness of the sleeve portion 410 of the inner pipe 400. Namely, the bar member 20a is arranged so as to be surrounded with a slight space between such that the bar member 20a is adjacent to the sleeve portion 410 of the dividing portion 420 of the inner pipe 400.

On the other hand, in a state for holding the work 40, the inner pipe 400 is inserted into the hole 41 of the work 40 and the positions of the inner pipe 400 and the bar member 20a are then relatively displaced. As a result, the bar member 20a comes in contact with a thick wall portion of a tip of each dividing portion 420 of the inner pipe 400. As shown in FIG. 7B, the dividing portion 420 of the inner pipe 400 is opened outside or in a diametrical direction.

Further, the dividing portion 420 can be easily pushed and widened by setting the bar member 20a to have a tip portion sharpened on the insertion direction side into the hole 41. Further, as shown in FIG. 7A, the dividing portion 420 can be further pushed and widened by forming the bar member 20a in a taper shape in which the side face of the tip portion is gradually widened as it is advanced in the insertion direction into the hole 41. Further, as shown in FIG. 7A, the dividing portion 420 can be easily pushed and widened by the bar member 20a by setting the dividing portion 420 to have a taper portion in which an opening area is gradually increased from an opening end portion.

MODIFIED EXAMPLE 5

Figure 8:
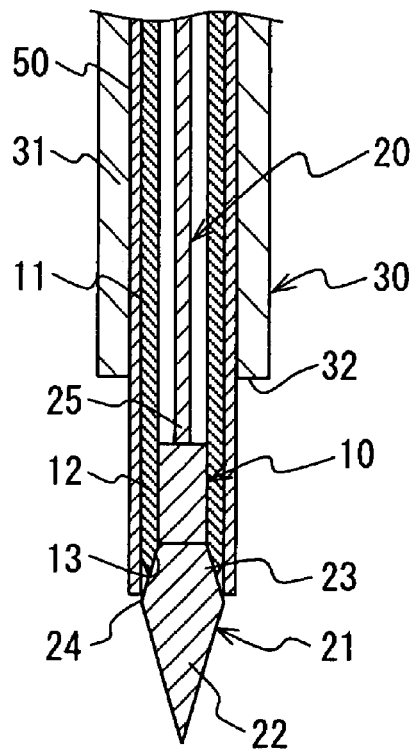
FIG. 8 is a cross-sectional view showing the schematic construction of a work gripping tool in a modified example 5 of the embodiment mode.

Further, a protecting pipe of the inner pipe 10 may be also arranged as a modified example 5. FIG. 8 is a cross-sectional view showing the schematic construction of a work gripping tool in the modified example 5. FIGS. 9A to 9E are cross-sectional views every process showing the operation of the work gripping tool in the modified example 5. In the modified example 5, there are many portions similar to those of the above embodiment mode and the modified examples 1 to 4.

When it is repeated that the dividing portion 12 of the inner pipe 10 is widened to grip the work and is originally returned to release the grip of the work, there is a possibility that the dividing portion 12 is formed in a shape widened more or less even in a state not pushed and widened by the projecting shape portion 21 of the bar member 20. In such a state, for example, as shown in FIGS. 3A and 3B, when the work gripping tool (the dividing portion 12 of the inner pipe 10 and the projecting shape portion 21 of the bar member 20 in a member located on a side lower than the outer pipe 30) is inserted into the hole 41 of the work 40, there is a possibility that the tip (dividing portion 12) of the inner pipe 10 comes in contact with an end portion (an opening end portion of the hole 41) of the work 40. Further, even when no dividing portion 12 is deformed, there is a possibility that the inner pipe 10 comes in contact with the end portion (the opening end portion of the hole 41) in accordance with an insertion angle into the hole 41 of the work 40, etc. Thus, when the tip (dividing portion 12) comes in contact with the end portion (opening end portion of the hole 41) of the work 40, there is a possibility of damage of the inner pipe 10.

Therefore, as shown in FIG. 8, in the modified example 5, a protecting pipe 50 (e.g., constructed by stainless steel) surrounding at least the dividing portion 12 around the inner pipe 10 and able to be slid in the axial direction of the hole 41 is arranged. This protecting pipe 50 is arranged so as to achieve the projecting shape portion 21 side (lower side on the paper face) from the inner pipe 10. Namely, the protecting pipe 50 is arranged on the work 40 side from the tip of the inner pipe 10 when the work gripping tool is inserted into the hole 41 of the work 40.

Figure 9A:
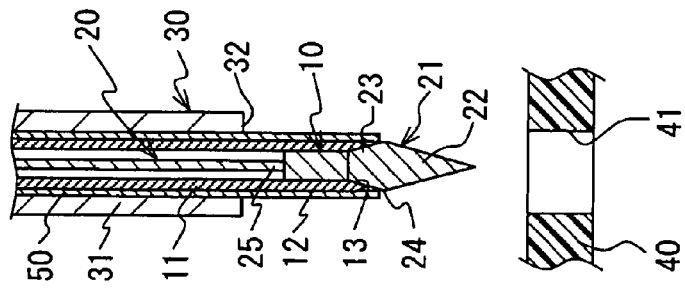
FIGS. 9A to 9E are cross-sectional views every process showing the operation of the work gripping tool in the modified example 5 of the embodiment mode.

Here, the operation of the work gripping tool arranging the protecting pipe 50 therein will be explained on the basis of FIGS. 9A to 9E. As shown in FIG. 9A, the bar member 20 is located in a stopping position before the work gripping tool is inserted into the hole 41 of the work 40. Accordingly, the projecting shape portion 21 of the bar member 20 is arranged outside the inner pipe 10 and is located in a position for pressing no inner pipe 10.

Figure 9B:
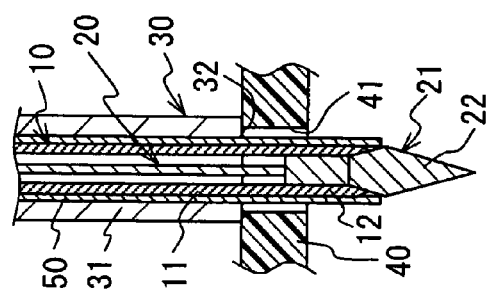
Figure 9C:
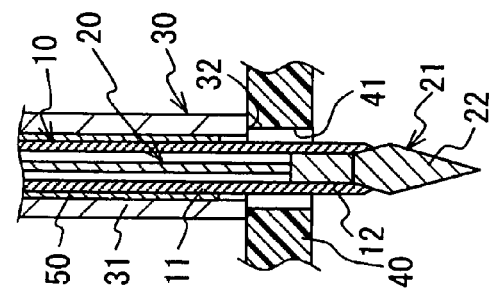

Next, as shown in FIG. 9B, one portion of the work gripping tool, i.e., one portion of the protecting pipe 50 in a member located on a side lower than the outer pipe 30, the dividing portion 12 of the inner pipe 10 of a state covered by the protecting pipe 50, and the projecting shape portion 21 of the bar member 20 are inserted into the hole 41 of the work 40. Next, only the protecting pipe 50 is pulled up as shown in FIG. 9C.

Figure 9D:
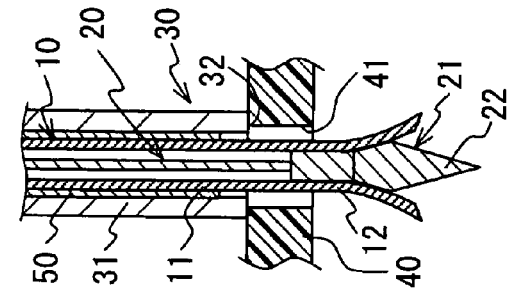
Figure 9E:
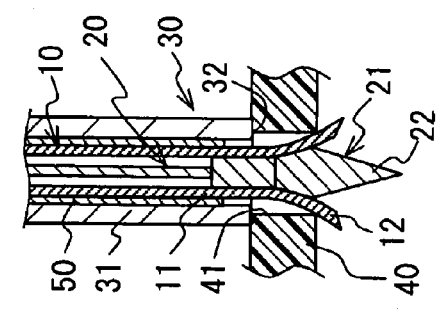

Thereafter, similar to the above embodiment mode, as shown in FIGS. 9D and 9E, the dividing portion 12 is pushed and widened by moving the bar member 20 in a direction opposed to the insertion direction into the hole 41. Further, the contact face 32 of the outer pipe 30 comes in contact with the work 40 by moving the bar member 20 in the direction opposed to the insertion direction into the hole 41. The work 40 is nipped by the outer pipe 30 and the dividing portion 12 of the inner pipe 10.

Thus, it is possible to restrain that the tip (dividing portion 12) comes in contact with an end portion (opening end portion of the hole 41) of the work 40. Accordingly, it is possible to restrain that the tip (dividing portion 12) comes in contact with the end portion of the work and is damaged. Further, the tip (dividing portion 12) can be compulsorily inserted into the projecting shape portion 21 (maximum outer shape portion 24) by arranging the protecting pipe 50 even when the tip (dividing portion 12) of the inner pipe 10 is bent more or less. Accordingly, life of the work gripping tool (inner pipe) can be also extended.

MODIFIED EXAMPLE 6

Figure 10:
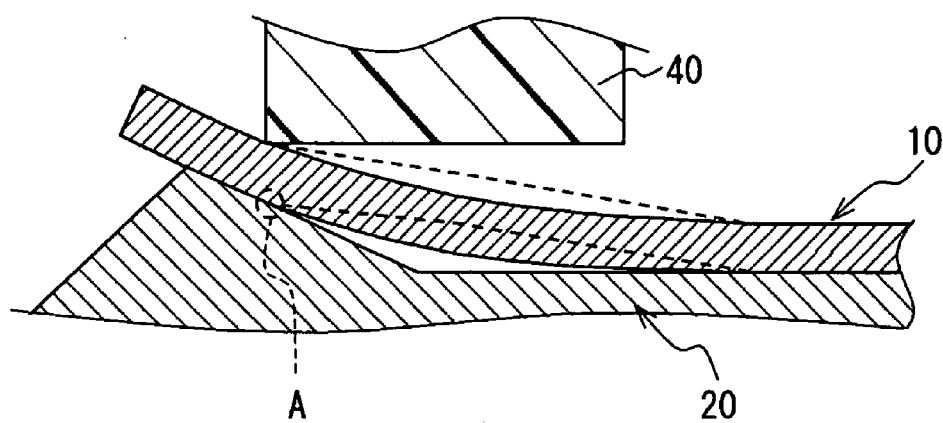
FIG. 10 is a cross-sectional view showing the schematic construction of a tip portion of a work gripping tool in a comparison example.

Further, a large portion of pulling-up force in pulling-up the work gripping tool may be also born by the bar member as a modified example 6. FIG. 10 is a cross-sectional view showing the schematic construction of a tip portion of the work gripping tool in a comparison example. FIGS. 11A to 11E are cross-sectional views every process showing the operation of the work gripping tool in the modified example 6. In the modified example 6, there are many portions similar to those of the above embodiment mode and the modified examples 1 to 5. In FIGS. 11A to 11E, the explanation is made by using an example having the protecting pipe 50, but the modified example 6 can be also adopted even when no protecting pipe 50 is arranged.

In the above embodiment mode, as shown in FIG. 3C, the bar member 20 is pulled up until the position of the inner pipe ceiling portion 14 of the inner pipe 10 in a state in which the work gripping tool is inserted into the hole 41 of the work 40. Further, as shown in FIG. 3D, the bar member 20 located in a gripping position is pulled up. Namely, the bar member 20 and the inner pipe 10 are pulled up in association with each other. In such a case, as shown in FIG. 10, there is a possibility that the inner pipe 10 is pulled in a pulling-up direction (right-hand side on the paper face) with point A nipped by the bar member 20 and the work 40 as a base point, and is plastically deformed as shown by a dotted line.

Therefore, in the work gripping tool in the modified example 6, a large portion of the pulling-up force is born by a bar member 20b and a release mechanism is arranged such that no pulling-up force of a predetermined force or more is applied to an inner pipe 10a.

Concretely, the bar member 20b is arranged such that a first projecting portion 29a (release mechanism) and a second projecting portion 29b (release mechanism) fixed to the bar member 20b and moved together with the bar member 20b and projected in a perpendicular direction from a side wall of a bar portion 25b are spaced at a predetermined interval. The first projecting portion 29a is arranged on a direction side on which the work gripping tool is inserted into the hole 41 of the work 40 from the second projecting portion 29b (lower side on the paper face). Further, the bar member 20b has a sliding ring 28 (release mechanism) slidable with respect to the bar member 20b (i.e., able to be set to be unmoved together with the bar member 20b) and arranged between the first projecting portion 29a and the second projecting portion 29b in a state in which a spring (elastic member) 15a (release mechanism) is interposed around the bar portion 25b between this bar portion 25b and the first projecting portion 29a. This sliding ring 28 is pressed on the second projecting portion 29b side by elastic force of the spring 15b in a normal state (i.e., a state in which no inner pipe 10 is pushed and widened in the bar member 20b).

A ceiling portion of the inner pipe 10a has an engaging portion 14a (release mechanism) for forming an opening portion through which the second projecting portion 29b can pass and no sliding ring 28 can pass. Namely, the opening portion wider than the area of the second projecting portion 29b and narrower than the area of the sliding ring 28 is formed by the engaging portion 14a in the ceiling portion of the inner pipe 10a.

The protecting pipe 50 has a convex portion 51 coming in contact with the first projecting portion 29a of the bar member 20a in a pulling-up state.

Here, the operation of the work gripping tool in the modified example 6 will be explained on the basis of FIG. 11A to 11E. First, as shown in FIG. 11A, one portion of the work gripping tool, i.e., one portion of the protecting pipe 50 in a member located on a side lower than an outer pipe 31a, the dividing portion of the inner pipe 10a of a state covered by the protecting pipe 50, and a projecting shape portion 21b and a tip portion 22b of the bar member 20b are inserted into the hole 41 of the work 40.

Next, as shown in FIG. 11B, only the protecting pipe 50 is pulled up until a position in which the convex portion 51 comes in contact with the first projecting portion 29a of the bar member 20b. The convex portion 51 can come in contact with the first projecting portion 29a of the bar member 20b by arranging an unillustrated through hole, etc. corresponding to the convex portion 51 in the inner pipe 10a.

Next, as shown in FIG. 11C, the bar member 20b and the protecting pipe 50 are pulled up in a state in which the work gripping tool is inserted into the hole 41 of the work 40. Namely, the bar member 20b is moved in a direction opposed to the insertion direction into the hole 41. At this time, the pulling-up is performed until a position in which the sliding ring 28 of the bar member 20b comes in contact with the engaging portion 14a of the inner pipe 10a. Thus, the projecting shape portion 21b is moved into the inner pipe 10a, and the projecting shape portion 21b (pressing portion) of the bar member 20b presses against the dividing portion of the inner pipe 10a. Accordingly, the dividing portion of the inner pipe 10a is pushed and widened by the projecting shape portion 21b (pressing portion).

As shown in FIG. 11D, the bar member 20b is then pulled up. When the bar member 20b is pulled up, force for pulling-up the bar member 20b is applied to the inner pipe 10a since the sliding ring 28 comes in contact with the engaging portion 14a of the inner pipe 10a. Thus, the inner pipe 10a is also pulled-up together by pulling-up the bar member 20b. Thus, the dividing portion of the inner pipe 10a is engaged with the work 40 on the rear face side (the lower side in FIGS. 11A to 11E) of the work 40, i.e., on a side opposed to the inserted side of the work gripping tool.

Thereafter, as shown in FIG. 11E, the bar member 20a is further pulled up. Thus, the spring 15a arranged between the sliding ring 28 and the first projecting portion 29a is contracted. In a state in which the sliding ring 28 is engaged with the engaging portion 14a of the inner pipe 10a, no inner pipe 10a is pulled up and only the first projecting portion 29a, the second projecting portion 29b, the projecting shape portion 21b, etc. fixed to the bar portion 25b are pulled up. It is released that the inner pipe 10a is operated in association with the movement of the bar member 20a. Since the work 40 is perfectly nipped by the dividing portion and the outer pipe 31a, the work 40 can be stably gripped.

Namely, in the work gripping tool in the modified example 6, when force for pulling-up the bar member 20b reaches a predetermined force, this force is absorbed by contracting the spring 15a and is not applied to the inner pipe 10a, or the applied force can be reduced. Accordingly, it is possible to restrain that the inner pipe 10a is plastically deformed.

MODIFIED EXAMPLE 7

Figure 12:
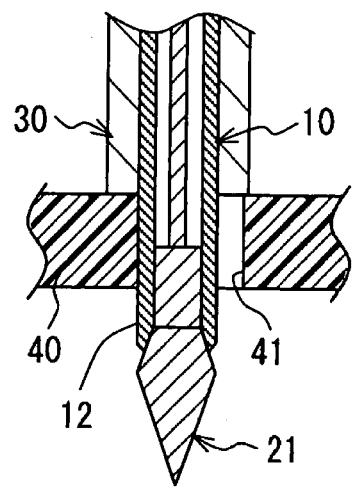
FIG. 12 is a cross-sectional view showing the schematic construction of a work gripping tool in a comparison example.
Figure 13A:
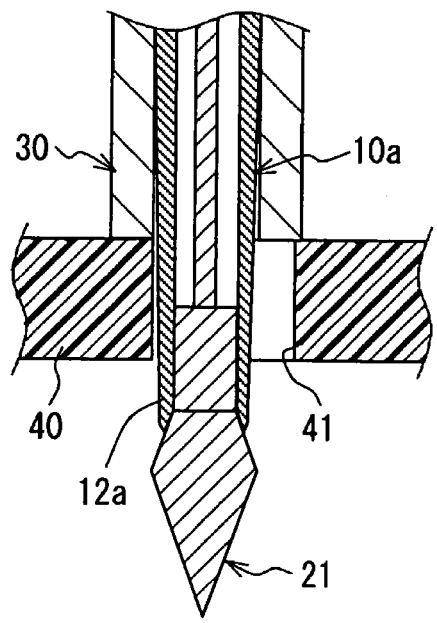
FIGS. 13A and 13B are cross-sectional views showing the schematic construction of a work gripping tool in a modified example 7 of the embodiment mode.
Figure 13B:
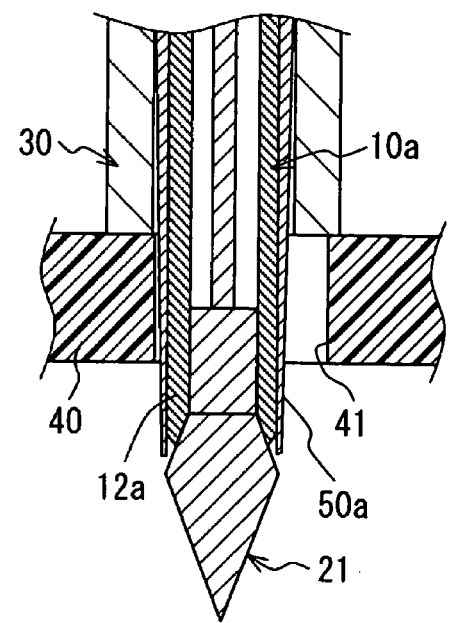

Further, a taper portion may be also arranged in at least one of the inner pipe and the protecting pipe as a modified example 7. FIG. 12 is a cross-sectional view showing the schematic construction of a work gripping tool in a comparison example. FIGS. 13A and 13B are cross-sectional views showing the schematic construction of a work gripping tool in the modified example 7. In the modified example 7, there are many portions similar to those of the above embodiment mode and the modified examples 1 to 6.

When the dividing portion 12 of the inner pipe 10 is originally returned to release the gripping of the work in a state in which the work gripping tool (the dividing portion 12 of the inner pipe 10 and the projecting shape portion 21 of the bar member 20 in a member located on a side lower than the outer pipe 30) is inserted into the hole 41 of the work 40, there is a case in which the inner pipe 10 comes in contact with a side wall of the hole 41 as shown in FIG. 12. When the work gripping tool is pulled out of the hole 41 as it is in such a state, the work 40 is also pulled up together by friction of the inner pipe 10 and the side wall of the hole 41 and engagement of the inner pipe 10 and the side wall of the hole 41. When the work 40 is thus pulled up together, there is a possibility that the work 40 is filed out of a jig (e.g., a work mounting portion in a manufacturing device, etc.)

Therefore, in the modified example 7, as shown in FIGS. 13A and 13B, when the inner pipe 10a or the protecting pipe 50a is arranged, a taper is arranged in a position opposed to the side face of the hole 41 in the protecting pipe 50a. This taper is arranged such that the diameter of the inner pipe 10a or the protecting pipe 50a is reduced as it is advanced onto the insertion direction side of the work gripping tool. In other words, this taper is arranged such that the distance between the inner pipe 10a or the protecting pipe 50a and the side wall of the hole 41 is widened as it is advanced onto the insertion direction side of the work gripping tool. Further, this taper is arranged from the position of a degree not entering the interior of the hole 41 of the work 40 in a state in which the work gripping tool (the dividing portion 12a of the inner pipe 10a, the projecting shape portion 21 of the bar member 20 and the protecting pipe 50a in a member located on a side lower than the outer pipe 30) is inserted into the hole 41 of the work 40. Namely, a base point of the taper is arranged so as to be located outside (upper side on the paper face) the work 40 in a state in which the work gripping tool is inserted into the hole 41 of the work 40. In other words, the base point of the taper is arranged so as to be located in an opening end portion of the inserted side of the work gripping tool of the hole 41, or in a direction opposed to the insertion direction of the work gripping tool from the opening end portion in a state in which the work gripping tool is inserted into the hole 41 of the work 40.

Thus, it is possible to restrain, that the work 40 is pulled up together by arranging the taper in the inner pipe 10a or the protecting pipe 50a even when the inner pipe 10a and the protecting pipe 50a come in contact with the side wall of the hole 41 in pulling-up the work gripping tool from the hole 41 of the work 40.

MODIFIED EXAMPLE 8

Figure 14:
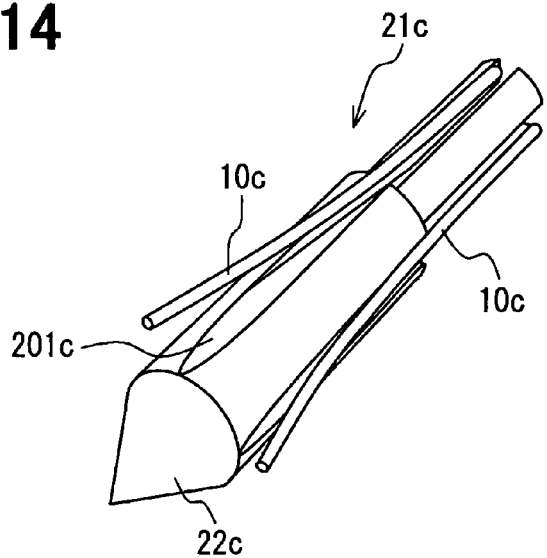
FIG. 14 is a perspective view showing the schematic construction of a work gripping tool in a modified example 8 of the embodiment mode.
Figure 15:
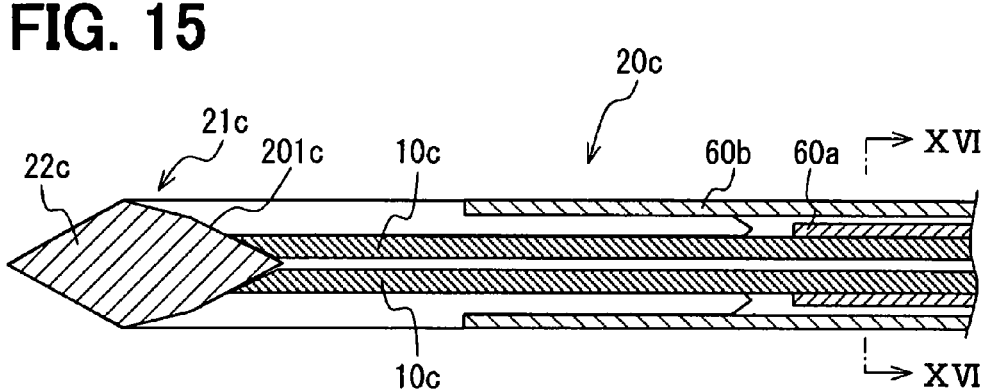
FIG. 15 is a cross-sectional view showing the schematic construction of the work gripping tool in the modified example 8 of the embodiment mode.
Figure 16:
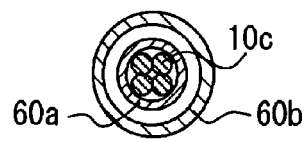
FIG. 16 is a cross-sectional view showing the schematic construction of the work gripping tool in the modified example 8 of the embodiment mode.
Figure 17:
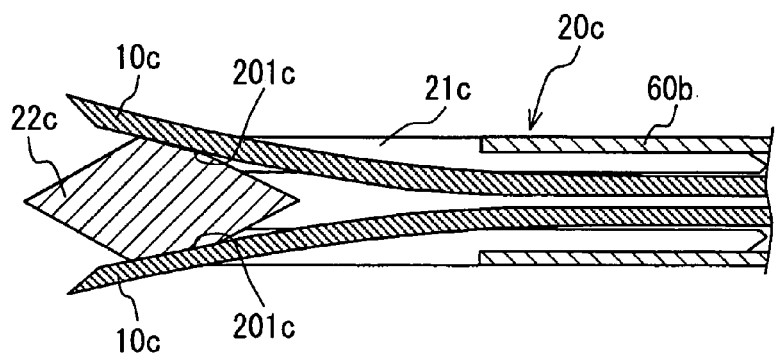
FIG. 17 is a cross-sectional view showing the schematic construction when a wire of the work gripping tool in the modified example 8 of the embodiment mode is widened.

Further, a wire may be also used instead of the inner pipe as a modified example 8. FIG. 14 is a perspective view showing the schematic construction of a work gripping tool in the modified example 8. FIG. 15 is a cross-sectional view showing the schematic construction of the work gripping tool in the modified example 8. FIG. 16 is a cross-sectional view showing the schematic construction of the work gripping tool in the modified example 8. FIG. 17 is a cross-sectional view showing the schematic construction when the wire of the work gripping tool in the modified example 8 is widened. In the modified example 8, there are many portions similar to those of the above embodiment mode and the modified examples 1 to 7.

As shown in FIGS. 14, 15, etc., a bar member 20c in the modified example 8 has a tip member 21c and a pipe 60b inserting one portion of the tip member 21c thereinto. The tip member 21c is a part for pushing and widening the wire 10c in plural portions (four portions in this embodiment mode). The tip member 21c has a groove 201c of a taper shape which becomes shallow in depth as it is advanced to the tip of the bar member 20c. The tip member 21c also has a tip portion 22c as a conical body sharpened on the insertion direction side into the hole 41. A part of a side opposed to the tip portion 22c in the tip member 21c is inserted into the pipe 60b. In other words, the tip member 21c corresponds to the projecting shape portion in the above embodiment mode. The groove 201c corresponds to the pressing portion in the above embodiment mode.

As shown in FIG. 15, etc., the wire 10c corresponding to the inner pipe (inner pipe 10, etc.) in the above embodiment mode, etc. is arranged within this bar member 20c. As shown in FIGS. 15 and 16, one portion of this wire 10c is arranged within the pipe 60a, and a tip side located in the exterior of the pipe 60a is arranged in the groove 201c of the tip member 21c.

Accordingly, in the modified example 8, the wire 10*c* is arranged within the bar member 20*c*, and it is different from the position relation of the inner pipe (inner pipe 10, etc.) and the bar member (bar member 20, etc.) in the above embodiment mode.

In the modified example 8, as shown in FIG. 17, the wire 10*c* is pushed and widened by the tip member 21*c* by relatively moving the bar member 20*c* and the wire 10*c* in opposite directions. Thus, the contact face of the unillustrated outer pipe comes in contact with the work 40, and the work 40 is nipped by the outer pipe and the wire 10*c*.

Thus, the wire 10*c* instead of the inner pipe (inner pipe 10, etc.) may be used.

For example, in the modified example 8, the contents of the above modified example 7 may be also applied. In this case, a taper is arranged in an area (hereinafter also called a horizontal portion) until a tip portion 22*c* in an area projected to the exterior from the pipe 60*b* in the tip member 21*c* in a position opposed to the side face of the hole 41 in the bar member. Namely, the horizontal portion of the tip member 21*c* is set to have a shape reduced in diameter as it is advanced to the tip. Thus, when the work gripping tool is pulled up from the hole 41 of the work 40, it is possible to restrain that the work 40 is also pulled up.

Further, in the modified example 8, no explanation relative to the outer pipe, etc. is made. However, similar to the above embodiment mode, the outer pipe, etc. are arranged in the exterior of the wire 10*c* and the bar member. The outer pipe for nipping the work 40 together with the wire 10*c* may be also arranged. Rough processing may be also performed on the contact face with the work 40 in this outer pipe.

Thus, the above embodiment mode and the modified examples can be also independently executed, and can be also suitably executed in combination with another modified example, etc.

The above disclosure has the following aspects.

According to a first aspect of the present disclosure, a holding device for holding an object, which has an opening, includes: a first member for being inserted into the opening of the object, wherein the first member has a cylindrical shape extending along with an axial direction of the cylindrical shape, which is in parallel to an axial direction of the opening of the object, wherein the first member includes a plurality of divisional portions, which are divided by a plurality of notches extending from one end of the cylindrical shape along with the axial direction of the cylindrical shape, and wherein the one end of the cylindrical shape is to be inserted into the opening of the object; and a second member including a shaft and a head, wherein the shaft is movable in the cylindrical shape along with the axial direction of the cylindrical shape, wherein the head is disposed on one end of the shaft, and wherein the head is smaller than a dimension of the opening of the object, and larger than an inner dimension of the cylindrical shape. Each divisional portion is expandable at the one end of the cylindrical shape by the head of the second member so that the expanded divisional portion holds the object when the first member together with the second member is inserted into the opening of the object, and the first member is relatively displaced toward the second member.

In the above device, the first member together with the second member is inserted into the opening of the object. Accordingly, the holding device is prevented from being dropped from the holding device. Further, since the object generally includes the opening, general versatility of the device is improved.

Alternatively, the device may further include a third member disposed on an outside of the first member. The third member and the expanded divisional portions sandwich the object. Further, the third member may be integrated with the first member. Alternatively, the third member may be independently disposed on the outside of the first member. Furthermore, the device may further include: an interlock element for displacing the first element toward the opening of the object associated with displacement of the second member toward the opening of the object. Furthermore, the device may further include: a release element for releasing interlock between the first and second members when a force for displacing the second member toward the opening of the object is equal to or larger than a predetermined force.

Alternatively, the third member may have a contact surface to the object, and the contact surface of the third member is a crude processed surface.

Alternatively, the third member may have a contact surface to the object, and each divisional portion has a bottom, which is substantially disposed on a same plane as the contact surface, or protrudes from the contact surface.

Alternatively, the third member may have a cylindrical shape, and each divisional portion is apart from an inner wall of the third member.

Alternatively, the cylindrical shape of the first member may have an inner diameter of the cylindrical shape, and each divisional portion has a tapered portion so that the inner diameter of the cylindrical shape decreases as it goes from the one end of the cylindrical shape toward a bottom of the divisional portion.

Alternatively, the head may have a cone top, which is sharpened toward one end of the head.

Alternatively, the head may include an middle portion for pressing the divisional portions of the first member, and the middle portion of the head has a tapered shape, a dimension of which increases toward one end of the head.

Alternatively, the head may have a maximum outer dimension, which is larger than an outer dimension of the first member.

Alternatively, the head may contact the divisional portions when the first member together with the second member is inserted into the opening of the object, and the second member is displaced toward the opening of the object.

Alternatively, the head may contact the divisional portions when the first member together with the second member is inserted into the opening of the object and the first member is relatively displaced toward the second member.

Alternatively, the device may further include a protection pipe surrounding the plurality of divisional portions in a movable manner that the protection pipe is movable along with an axial direction of the first member. The protection pipe together with the plurality of divisional portions is capable of being inserted into the opening of the object. Further, the cylindrical shape of the first member may have an inner diameter. Each divisional portion has a tapered portion so that the inner diameter of the cylindrical shape decreases as it goes from the one end of the cylindrical shape toward a bottom of the divisional portion, and the protection pipe has an inner diameter, which increases toward one end of the protection pipe.

According to a second aspect of the present disclosure, a holding device for holding an object, which has an opening, includes: a first member for being inserted into the opening of the object, wherein the first member has a cylindrical shape extending along with an axial direction of the cylindrical shape, which is in parallel to an axial direction of the opening of the object, wherein the first member includes a plurality of divisional portions, which are divided by a plurality of notches extending from one end of the cylindrical shape along with the axial direction of the cylindrical shape, wherein the one end of the cylindrical shape is to be inserted into the opening of the object, and wherein the plurality of divisional portions provides an inner dimension of the cylindrical shape, which is smaller than an inner dimension of another portion of the first member; and a second member movable in the cylindrical shape of the first member along with the axial direction of the cylindrical shape, wherein the second member is larger than the inner dimension of the plurality of divisional portions. Each divisional portion is expandable at the one end of the cylindrical shape by the second member so that the expanded divisional portion holds the object when the first member together with the second member is inserted into the opening of the object, and the first member is relatively displaced toward the second member.

In the above device, the first member together with the second member is inserted into the opening of the object. Accordingly, the holding device is prevented from being dropped from the holding device. Further, since the object generally includes the opening, general versatility of the device is improved.

Alternatively, the second member may contact the divisional portions when the first member together with the second member is inserted into the opening of the object, and the second member is relatively displaced toward the first member.

Alternatively, the second member may contact the divisional portions when the first member together with the second member is inserted into the opening of the object, and the first member is displaced toward the opening of the object.

According to a third aspect of the present disclosure, a holding device for holding an object, which has an opening, includes: a first member for being inserted into the opening of the object, wherein the first member includes a plurality of wires and a holder, wherein the holder holds the plurality of wires, and wherein the plurality of wires are apart from each other; and a second member including a shaft and a head, wherein the first member is disposed on an outside of the second member in such a manner that the first member is movable along with an axial direction of the shaft, wherein the head is disposed on one end of the shaft, wherein the head has a plurality of grooves corresponding to the plurality of wires, and wherein each groove has a depth, which becomes shallower toward one end of the head. Each wire is expandable at one end of the wire by the head of the second member so that the expanded wire holds the object when the first member together with the second member is inserted into the opening of the object, and the first member is relatively displaced toward the second member.

In the above device, the first member together with the second member is inserted into the opening of the object. Accordingly, the holding device is prevented from being dropped from the holding device. Further, since the object generally includes the opening, general versatility of the device is improved.

Alternatively, each wire may have a tapered shape, which corresponds to the depth of the groove.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A holding device for holding an object, which has an opening, the device comprising:
   a first member for being inserted into the opening of the object, wherein the first member has a cylindrical shape extending along with an axial direction of the cylindrical shape, which is in parallel to an axial direction of the opening of the object, wherein the first member includes a plurality of divisional portions, which are divided by a plurality of notches extending from one end of the cylindrical shape along with the axial direction of the cylindrical shape, and wherein the one end of the cylindrical shape is to be inserted into the opening of the object; and
   a second member including a shaft and a head, wherein the shaft is movable within the cylindrical shape in the axial direction of the cylindrical shape, the head is disposed on one end of the shaft, and wherein the head is smaller than a dimension of the opening of the object and larger than an inner dimension of the cylindrical shape; and
   a third member disposed on an outside of the first member; wherein
   each divisional portion is expandable at the one end of the cylindrical shape by the head of the second member so that the expanded divisional portion holds the object when the first member together with the second member is inserted into the opening of the object, and the first member is relatively displaced toward the second member,
   the second member, together with the expanded divisional portions, is movable in an axial direction of the cylindrical shape after the divisional portions are expanded, and
   the third member and the expanded divisional portions sandwich the object.

2. The device according to claim 1, wherein the third member is integrated with the first member.

3. The device according to claim 1, wherein the third member is independently disposed on the outside of the first member.

4. The device according to claim 3, further comprising: an interlock element for displacing the first element toward the opening of the object associated with displacement of the second member toward the opening of the object.

5. The device according to claim 4, further comprising: a release element for releasing interlock between the first and second members when a force for displacing the second member toward the opening of the object is equal to or larger than a predetermined force.

6. The device according to claim 1, wherein
   the third member has a contact surface to the object, and
   the contact surface of the third member is a crude processed surface.

7. The device according to claim 1, wherein
   the third member has a contact surface to the object, and
   each divisional portion has a bottom, which is substantially disposed on a same plane as the contact surface, or protrudes from the contact surface.

8. The device according to claim 1, wherein
   the third member has a cylindrical shape, and
   each divisional portion is apart from an inner wall of the third member.

9. The device according to claim 1, wherein
   the cylindrical shape of the first member has an inner diameter of the cylindrical shape, and
   each divisional portion has a tapered portion so that the inner diameter of the cylindrical shape decreases as it goes from the one end of the cylindrical shape toward a bottom of the divisional portion.

10. The device according to claim 1, wherein the head has a cone top, which is sharpened toward one end of the head.

11. The device according to claim 1, wherein
the head includes an middle portion for pressing the divisional portions of the first member, and
the middle portion of the head has a tapered shape, a dimension of which increases toward one end of the head.

12. The device according to claim 1, wherein the head has a maximum outer dimension, which is larger than an outer dimension of the first member.

13. The device according to claim 1, wherein the head contacts the divisional portions when the first member together with the second member is inserted into the opening of the object, and the second member is displaced toward the opening of the object.

14. The device according to claim 1, wherein the head contacts the divisional portions when the first member together with the second member is inserted into the opening of the object and the first member is relatively displaced toward the second member.

15. The device according to claim 1, further comprising: a protection pipe surrounding the plurality of divisional portions in a movable manner that the protection pipe is movable along with an axial direction of the first member, wherein the protection pipe together with the plurality of divisional portions is capable of being inserted into the opening of the object.

16. The device according to claim 15, wherein
the cylindrical shape of the first member has an inner diameter,
each divisional portion has a tapered portion so that the inner diameter of the cylindrical shape decreases as it goes from the one end of the cylindrical shape toward a bottom of the divisional portion, and
the protection pipe has an inner diameter, which increases toward one end of the protection pipe.

* * * * *